United States Patent

[11] 3,602,557

[72] Inventor Pierre Girot
 Paris, France
[21] Appl. No. 810,475
[22] Filed Mar. 26, 1969
[45] Patented Aug. 31, 1971
[73] Assignee L'Air Liquide Societe Anonyme pour
 l'Etude et l'Exploitation des Procedes
 Georges Claude
[32] Priority Apr. 12, 1968
[33] France
[31] 148044

[54] ARRANGEMENT FOR DAMPING VIBRATIONS IN THE BEARINGS OF ROTATABLE SHAFTS
 7 Claims, 5 Drawing Figs.
[52] U.S. Cl. ............................................. 308/122
[51] Int. Cl. ............................................. F16c 1/24
[50] Field of Search ............................................. 308/9, 122, 120

[56] References Cited
UNITED STATES PATENTS
2,449,297 9/1948 Hoffer ............................ 308/122
2,459,825 1/1949 Martellotti ..................... 308/122

Primary Examiner—Frederick L. Matteson
Assistant Examiner—Frank Susko
Attorney—Young & Thompson ABSTRACT: Cryogenic helium expansion turbine shaft and bearing lubricated by injecting gas under pressure, wherein the bearing comprises recesses regularly spaced around the periphery of the bearing, the recesses being provided with tubes which connect them with the other recesses through an annular groove formed in the bearing.

PATENTED AUG 31 1971 3,602,557

INVENTOR
PIERRE GIROT
BY Young & Thompson
ATTYS.

3,602,557

ARRANGEMENT FOR DAMPING VIBRATIONS IN THE BEARINGS OF ROTATABLE SHAFTS

This invention relates to an arrangement for damping vibrations in the bearing of rotatable shafts. More particularly, the invention is concerned with an arrangement for damping vibrations, or oscillations, in a bearing which is lubricated by injecting gas under pressure into a space formed between the shaft and the bearing from injection ducts arranged in the bearing or the shaft and wherein the bearing or the shaft has recesses disposed opposite said space, the number of which is a multiple of, is equal to or is a submultiple of the number of injection ducts, the angular offsetting of the recesses between themselves and relatively to the injection ducts being constant.

Such bearings are used to support rotatables shafts of machines, more particularly for shafts which are required to rotate at high speeds of up to several hundred thousand revolutions per minute, for example small gas expansion turbine for machines for the production of cold at low temperature and more particularly for the liquefaction of hydrogen or helium. Bearings of this type are generally referred to as "hydrostatic gas bearings." These gas bearings enable there to be obtained rotational speeds very much higher than those obtained with normal bearings, but they exhibit, at a certain fairly high rotational speed, vibrations which may be amplified and cause them to seize. This kind of vibration is generally referred to as "half-speed whirl."

It has already been proposed to damp these vibrations, or oscillations, by providing each of the conduits for supplying gas towards the injection recesses with a constriction and a chamber connected in series, or to arrange in the bearing both injection ducts and chambers for discharging gas towards the ambient atmosphere, followed by constrictions, or other devices for 90° phase displacement between the gas delivery and the pressure in the injection ducts opposite the rotating shaft, so as to produce a pressure maximum in a gas introduction duct at the instant when the shaft is in its central position and is displaced towards the said duct. Such devices, however, result in considerable gas consumption rates and are relatively complicated.

It is an object of the invention to obviate the aforesaid disadvantages and to permit effective damping of the oscillations of a shaft relatively to its bearing and, consequently, to achieve relatively high rotational speeds with a low gas consumption.

Thus, in accordance with the invention there is provided and arrangement for damping vibrations in the bearing of a shaft adapted to rotate relative to the bearing, wherein the bearing is lubricated by injecting gas under pressure into a space formed between the shaft and the bearing, from gas injection ducts arranged in the bearing or the shaft, wherein the bearing or the shaft comprises recesses opposite said space, the number of which is a multiple of, is equal to or is submultiple of the number of injection ducts, and wherein angular offsetting of the recesses relatively to one another and relatively to the injection ducts is constant, characterized in that at least two of the recesses, which have a constant angular spacing from one another, are connected to one another by at least one conduit which does not form part of the pressure gas distribution network and is different from the bearing clearance, said conduit being of small diameter over at least a part of its length.

Advantageously, the invention also comprises the following features taken separately or in any combination thereof:

a. the recesses are arranged in the bearing which is fixed, and the conduit of small diameter which connects some of these recesses is constituted, inside the bearing, by radial tubes and a circular groove formed in the body of the bearing and concentric therewith;

b. the number of recesses connected together is at least three;

c. $n$ groups of recesses exist which are connected respectively to one another by $n$ conduits, and these groups are angularly offset relatively to one another by an angle equal to the fraction $1/n$ of the angle formed between the center and the radial axes of two successive recesses of the same group;

d. at least a proportion of the injection ducts debouch into recesses which are regularly distributed over the periphery of the bearing or of the shaft;

e. at least a proportion of the recesses, which are uniformly distributed over the periphery of the bearing or of the shaft, are not connected to any injection duct;

f. the recesses are arranged on the rotatable shaft adjacent the bearing, and the conduit of small diameter which connects some of these recesses is constituted by radial tubes formed in the body of the shaft.

For a better understanding of the invention, and to show how the same may be carried into effect, reference will now be made, by way of example, to the accompanying drawings, in which.

Figure 3:
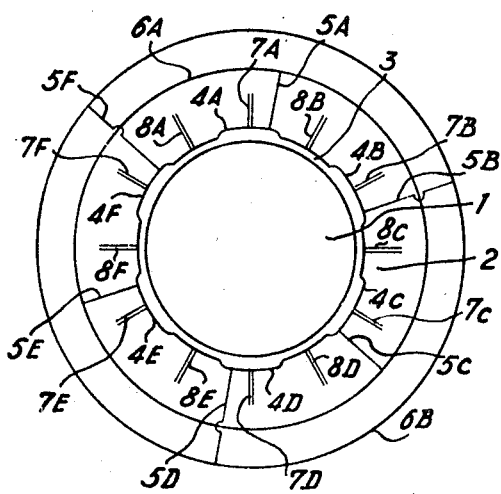
FIG. 3 is a sectional view, similar to that of FIG. 1, of a second embodiment of a stabilization arrangement in accordance with the invention applied to a cryogenic helium expansion turbine.
Figure 4:
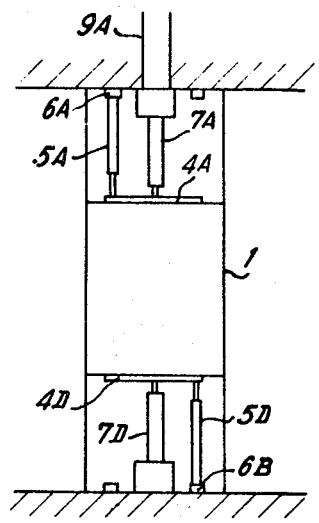
Figure 5:
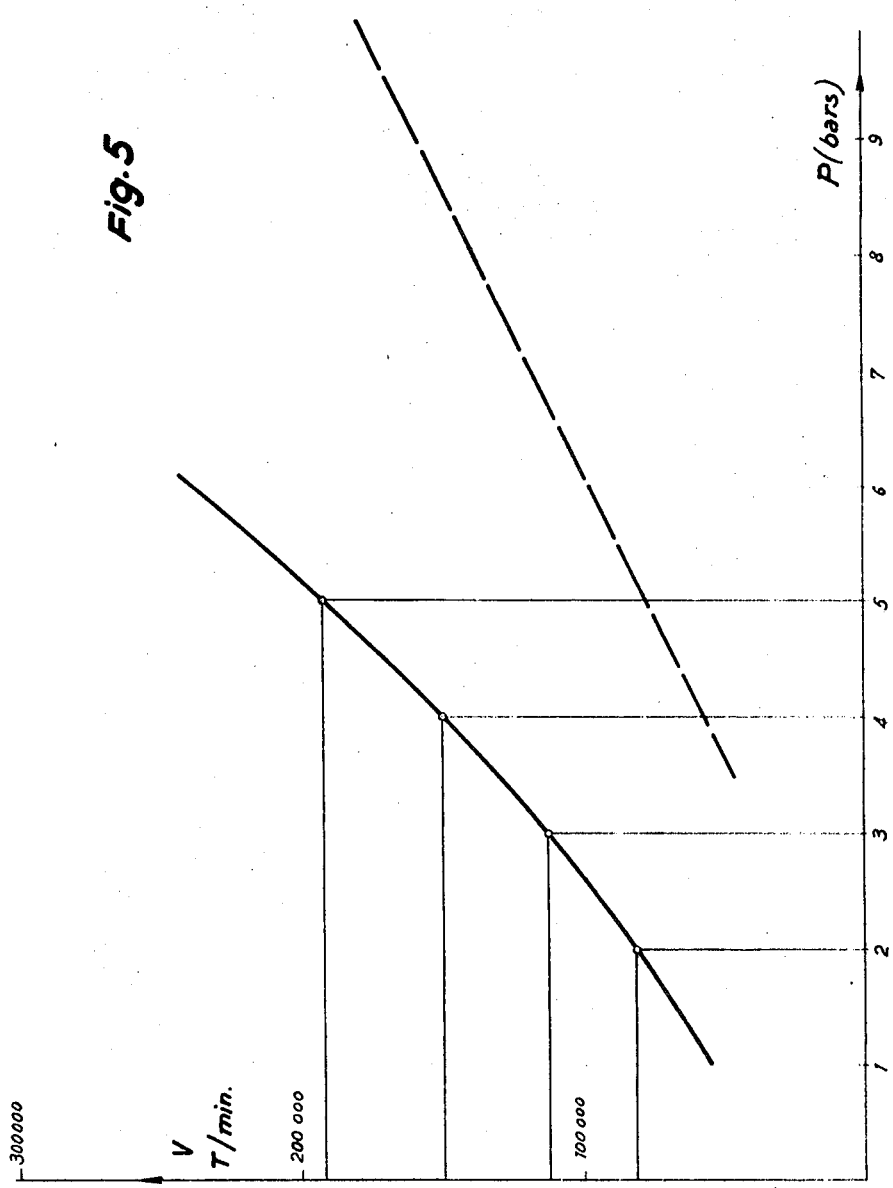

FIG. 4 shows the stabilization arrangement of FIG. 3 viewed as a section taken through a diameter plane, this plane being assumed for simplicity to contain both axes of two apertures for introduction of gas under pressure and two apertures for balancing which are connected to a conduit joining a group of recesses; and FIG. 5 is a diagram showing the variation in the critical speed of rotation (above which nondamped vibrations appear) of the shaft of the device shown in FIGS. 3 and 4 as a function of the relative pressure of the injected helium and, by way of comparison, the variation of this same critical speed of rotation in the case of a similar shaft whose bearings are not provided with the stabilization arrangements of the invention.

Figure 1:
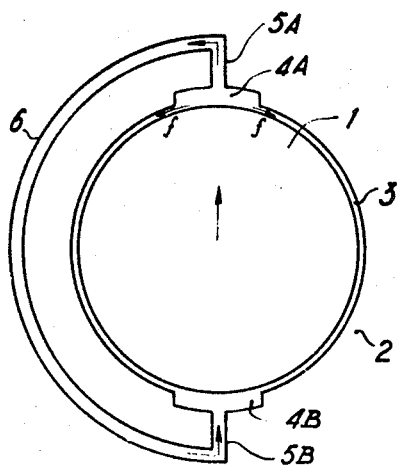
FIG. 1 is a sectional view of a simplified stabilization arrangement along a vertical diameter of the bearing and illustrating the principle on which the invention based, the section being taken through a plane perpendicular to the axis of the shaft.

Referring first to FIG. 1, there is shown a stabilization arrangement in which a shaft 1 is arranged within a bearing 20 so as to leave a clearance 3 in which gas circulates. The gas is injected, by way of ducts (not shown), into recesses 4A and 4B and penetrates into the clearance between the shaft and the bearing as indicated by the arrows $f$. The recesses 4A, 4B are connected by tubes 5A and 5B to a balancing conduit 6, the diameters of the tubes and conduit being exaggerated for the sake of clarity.

If it is assumed that at a given instant in a vibration, the shaft 1 is directed towards the recess 4A, as indicated by the vertical arrow on the shaft 1, it will be understood that the gas which is compressed in the recess 4A escapes through the tube 5A into the conduit 6, while the reduced pressure which occurs in the chamber 4B causes the entry into the said chamber by way of the tube 5B of a portion of the gas contained in the conduit 6.

Naturally, a device of this kind provides stabilization only along the diameter which passes through recesses 4A and 4B, and cannot be used simply in this form. It is necessary to add a similar arrangement for stabilization along a diameter perpendicular to the diameter which passes through recess 4A and 4B. Alternatively, there can be constructed an arrangement in which at least three recesses are spaced uniformly around the periphery of the bearing.

Figure 2:
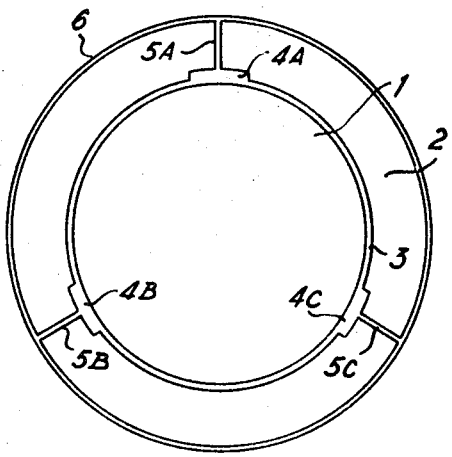
FIG. 2 is a sectional view, similar to that of FIG. 1, of one embodiment of a stabilization arrangement in accordance with the invention.

FIG. 2 shows stabilization arrangement having three recesses spaced at 120° intervals around the periphery of the bearing, thereby effecting satisfactory stabilization of the shaft 1. More particularly, it comprises the recesses 4A, 4B and 4C, which are provided with tubes 5A, 5B and 5C, each of which connects its associated recess with an annular groove 6 formed in the bearing. The introduction of a gas under pressure into the recesses 4A, 4B and 4C is effected by way of ducts, not shown in the illustration, which are arranged, for example, above or below the plane of FIG. 2.

Turning now to FIG. 3, there is shown a stabilization arrangement having six balancing recesses spaced at 60° intervals around the periphery of the bearing for the stabilization of a shaft of a small cryogenic helium turbine. The clearance between the shaft and the bearings has been exaggerated for greater clarity. The recesses 4A, 4B, 4C, 4D, 4E and 4F are provided with ducts 7A to 7F, only a part of the ducts being shown, for the injection of helium under pressure. As shown in FIG. 4, which is the same device in diametral section, each gas injection duct, for example duct 7A, comprises a plurality of successive bores the diameter of which increases towards the exterior. The injection ducts are connected to supply conduits, for example duct 7A is connected to conduit 9A. Six other ducts, 8A to 8F, are arranged in the bearing between the ducts connected to the recesses 4A to 4F, and spaced at 60° intervals, with an angular offsetting of 30.

In one specific embodiment of the type shown in FIGS. 3 and 4 the shaft 1 had a diameter of 14 mm. and a length of 8.4 mm. engaging the bearing, the recesses 4A to 4F had, for example, a depth of 0.02 mm. and a width of 5 mm. and they each subtended an angle of 25° at the center of the shaft. The helium injection ducts had a diameter of 0.30 mm. in the vicinity of the surface of the bearing. The tubes 5A to 5F had a diameter of 0.25 mm. in the vicinity of the corresponding recess, then increasing to 0.30 mm. They were connected to annular grooves 6A and 6B formed in the bearing (the diameters of the circles described by the grooves 6A and 6B formed in the bearing (the diameters of the circles described by the grooves 6A and 6B are shown as being different in FIG. 3 to enable them to be distinguished from one another, but they are in reality of equal diameter). These grooves have for example rectangular cross section of 0.5 ×0.5 mm. with a circle diameter of 39 mm.

FIG. 5 shows the variation of the critical stable speed (in revolutions per minute) as a function of the effective pressure (in bars) at which the helium is injected for, on the one hand, a system having 12 injection apertures but without the stabilization arrangement according to the invention (broken-line curve) and, on the other hand, for a system having the stabilization arrangement according to the invention which is illustrated in FIGS. 3 and 4 (full-line curve). It will be observed that the stabilization arrangement according to the invention makes it possible to achieve a notably higher rotational speed for a given pressure of injected helium (the critical speed being more than doubled) or the same critical stable speed for a notably lower helium injection pressure (for example a speed of approximately 110,000 revolutions per minute with an injection pressure 3 bars effective instead of 6.5 bars). The consumption of helium for the same critical stable speed is therefore considerably reduced.

It will be understood that various modifications may be made to the stabilization arrangements which have just been described within the scope of the present invention. More particularly, although a more difficult constructions, it is possible to arrange the gas injection ducts and balancing conduits in the rotation shaft itself and not in the fixed bearing.

The invention can also be applied to machines having shafts rotating at a high speed, for example rotary compressors, gyroscopes and centrifuges. It can also be applied to conical or spherical bearings or thrust bearings.

Having described my invention I claim:

1. In a bearing assembly comprising a bearing and a shaft rotatable relative to the bearing, the shaft and bearing having a space therebetween for lubrication by gas under pressure, recesses in one of said bearing and shaft opening into said space, said recesses being disposed symmetrically about the axis of the shaft and being spaced equal angular distances about the axis of the shaft, one of said bearing and shaft having supply ducts therein for supplying gas under pressure to said space; the improvement comprising at least one duct in one of said bearing and shaft interconnecting at least two of said recesses, said duct being entirely spaced from said 2 ducts and entirely spaced from said space and having a least width substantially less than the width of the recesses.

2. An assembly as claimed in claim 1, said recesses and ducts being disposed in said bearing.

3. An assembly as claimed in claim 2, said interconnecting duct comprising radially disposed portions that communicate with said recesses and a circular groove in the bearing that interconnects said radially extending portions.

4. An assembly as claimed in claim 1, the recesses interconnected by said interconnecting duct being at least three in number.

5. An assembly as claimed in claim 1, said supply ducts emptying into said recesses.

6. In a bearing assembly comprising a bearing and a shaft rotatable relative to the bearing, the shaft and bearing having a space therebetween for lubrication by gas under pressure, recesses in one of said bearing and shaft opening into said space, said recesses being disposed symmetrically about the axis of the shaft equal angular distances about the axis of the shaft, one of said bearing and shaft having supply ducts therein for supplying gas under pressure to said space; the improvement comprising at least one duct in one of said bearing and shaft interconnecting at least two of said recesses, said duct being entirely spaced from said gas-supply ducts and entirely spaced from said space and having a least width substantially less than the width of the recesses, said recesses being arranged in at least two groups with the recesses of each group interconnected by a said interconnecting duct, adjacent groups being offset from each other by equal angles.

7. An assembly as claimed in claim 1, the areas of said recesses that open into said space being substantially equal to each other.